United States Patent
Carver et al.

(10) Patent No.: US 7,451,467 B2
(45) Date of Patent: Nov. 11, 2008

(54) CONTENT/SERVICE HANDLING AND DELIVERY

(75) Inventors: David Carver, Lexington, MA (US); Branko J. Gerovac, Lexington, MA (US); R. James Kelso, Acton, MA (US); Yvette Marie Gordon, Orlando, FL (US); Mark Sanders, Carlisle, MA (US); Brian E. Kahn, Arlington, MA (US)

(73) Assignee: Seachange International, Inc., Acton, MA (US)

( * ) Notice: Subject to any disclaimer, the term of this patent is extended or adjusted under 35 U.S.C. 154(b) by 846 days.

(21) Appl. No.: 10/455,916

(22) Filed: Jun. 6, 2003

(65) Prior Publication Data

US 2004/0015986 A1 Jan. 22, 2004

Related U.S. Application Data

(63) Continuation of application No. 09/723,385, filed on Nov. 28, 2000.

(51) Int. Cl.
*H04N 7/10* (2006.01)
*H04N 7/025* (2006.01)
*H04N 7/173* (2006.01)
*H04N 7/16* (2006.01)

(52) U.S. Cl. .............. 725/34; 725/32; 725/35; 725/36; 725/114; 725/115; 725/138; 725/144

(58) Field of Classification Search .......... 725/32, 725/34, 35, 36, 114, 115, 138, 144
See application file for complete search history.

(56) References Cited

U.S. PATENT DOCUMENTS

| | | | |
|---|---|---|---|
| 5,371,551 A | 12/1994 | Logan et al. | |
| 5,649,093 A | 7/1997 | Hanko et al. | |
| 5,724,521 A * | 3/1998 | Dedrick | 705/26 |
| 5,805,821 A | 9/1998 | Saxena et al. | |
| 5,815,146 A | 9/1998 | Youden et al. | |
| 5,862,312 A | 1/1999 | Mann et al. | |

(Continued)

FOREIGN PATENT DOCUMENTS

WO WO9955066 * 10/1999

(Continued)

OTHER PUBLICATIONS

Gator.com (or Claria.com), 1998.*

(Continued)

*Primary Examiner*—Joseph G Ustaris
(74) *Attorney, Agent, or Firm*—Proskauer Rose LLP

(57) ABSTRACT

An enhanced playback method including receiving real time content from source links connected to a sources, simultaneously storing the real time content as stored content using a fault tolerant and load balancing method, aggregating the real time content and stored content from additional content, delivering content real time or stored in response to a user request from a user on a terminal system using a cut-through forwarding method.

A content/service handling and delivery system including source input/output (I/O) links, a content handling subsystem, the content handling subsystem connected to the source input links, a service delivery subsystem connected to the content handling subsystem, an input and interaction subsystem connected to the service delivery subsystem and terminal I/O links, the plurality terminal I/O links connected to the service delivery subsystem.

21 Claims, 11 Drawing Sheets

U.S. PATENT DOCUMENTS

| | | | |
|---|---|---|---|
| 6,029,045 A | | 2/2000 | Picco et al. |
| RE36,801 E | | 8/2000 | Logan et al. |
| 6,141,010 A | * | 10/2000 | Hoyle .......................... 715/854 |
| 6,182,050 B1 | * | 1/2001 | Ballard ........................ 705/14 |
| 6,425,127 B1 | | 7/2002 | Bates et al. |
| 6,526,575 B1 | * | 2/2003 | McCoy et al. ................. 725/36 |
| 6,588,013 B1 | * | 7/2003 | Lumley et al. ................ 725/32 |
| 6,718,551 B1 | * | 4/2004 | Swix et al. .................... 725/32 |
| 6,751,299 B1 | | 6/2004 | Brown et al. ............ 379/88.18 |
| 2002/0010930 A1 | | 1/2002 | Shah-Nazaroff et al. |
| 2002/0026351 A1 | | 2/2002 | Coleman .................... 705/14 |
| 2002/0083444 A1 | | 6/2002 | Blasko et al. |
| 2002/0095676 A1 | * | 7/2002 | Knee et al. ................... 725/46 |
| 2002/0152462 A1 | | 10/2002 | Hoch et al. |

FOREIGN PATENT DOCUMENTS

| | | |
|---|---|---|
| WO | 00/14951 | 3/2000 |
| WO | WO 00/52934 | 9/2000 |
| WO | 01/47156 A2 | 6/2001 |
| WO | WO 01/47156 A2 | 6/2001 |

OTHER PUBLICATIONS

Cartwright, C.T. "Issues in Multiplex and Service Management in Digital Multichannel Broadcasting", International Broadcasting Convention, London, GB, pp. 308-313.

Weiss, S.M. "Switching Facilities in MPEG-2: Necessary But Not Sufficient", SMPTE Inc., Scarsdale, NY, US, vol. 14, No. 2, Dec. 1, 1995, pp. 788-802.

* cited by examiner

CONTENT/SERVICE HANDLING AND DELIVERY

This application is a continuation of U.S. application Ser. No. 09/723,385, filed Nov. 28, 2000.

TECHNICAL FIELD

This invention relates to content/service handling and delivery.

BACKGROUND

Interactive television (ITV) is limited as a user's choosing to interact must either sacrifice viewing their primary program or split a viewing screen and their attention between programs. The introduction of digital home Personal Video Recording (PVR) devices has enhanced the user experience by providing the ability of storing (recording) many hours of content and controlling the recording through use of an associated electronic program guide. Home PVR devices record one program at a time and are oriented around content and not broad-based delivery of content and services. Further, advertising contained in recorded programs can easily become stale if played back at a time distant from when the program was aired.

Video on demand systems provide a user access to a singular library of available video assets maintained at the discretion of a provider and with limited user options.

SUMMARY

In an aspect the invention features an enhanced playback method including receiving real time content from source links connected to a sources, simultaneously storing the real time content as stored content using a fault tolerant and load balancing method, aggregating the real time content and stored content from additional content, delivering content real time or stored in response to a user request from a user on a terminal system using a cut-through forwarding method. The real time content and the additional content is data. The data includes one or more of the following: audio/video data, web pages, images, graphics, software programs, software scripts, non-linear compositions, multi-media compositions, voice, data calls and data messages.

The cut-through forwarding method includes receiving content in an input component of a content storage and cut-through forwarding system, sending the content in the input component to at least one store and forward components in the content storage and cut-through forwarding system, each store and forward component including a buffer and a local storage subsystem and sending content from the buffer or local storage subsystem to an output component of the content storage and cut-through forwarding system. Storage uses a content storage and cut-through forwarding system or a network of cut-through forwarding systems managed by a content propagation and cut-through routing system.

The method further includes propagating and routing content via a network of content storage and cut-through forwarding systems. Content may received, replaced, inserted, segmented, stored and reassembled in one or more of content storage and cut-through forwarding systems in the network.

In another aspect, the invention features a content/service handling and delivery system including source input/output (I/O) links, a content handling subsystem, the content handling system connected to the source input links, a service delivery subsystem connected to the content handling system, an input and interaction subsystem connected to the service delivery subsystem and terminal I/O links, the plurality terminal I/O links connected to the service delivery subsystem.

The content handling subsystem includes content importers, service gateway links and a storage subsystem, the storage subsystem storing all content in a content information base and a content library, the storage subsystem connected to the plurality of content importers and service gateway links.

Each of the content importers includes an import processor for processing and preparing received content for subsequent storage and use, an import operator interface connected to the import processor for configuring and controlling the import processor; and an information database interface for connection of associated information databases used in conjunction with the import processor.

The storage subsystem uses a content storage and cut-through forwarding system or a network of cut-through forwarding systems managed by a content propagation and cut-through routing system.

Embodiments of the invention may have one or more of the following advantages.

The system and method are user-driven and may be tailored to the needs of the user and provide expansion and adaptability as user needs evolve over time. Distinction, barriers, and conflicts between personal video recording, video on demand, and interactive services are eliminated.

The system and method are designed such that a service provider provides users access to real-time content, time-shifted content and time-delayed content from all sources in a efficient, load balanced, and fault tolerant manner. In embodiments, useful, for example, this includes digital cable television, digital subscriber line (DSL) systems, and residential broadband Internet.

The system supports a cut-through delivery such that users can use content while the content is simultaneously and transparently stored in the provider content library.

The system may maintain a personal video guide for each user. In embodiments, useful, for example, status information is maintained for all assets in the personal video guide and a video bookmark mechanism is used to track the user's current position in all content the user is using.

Users may seamlessly access as many simultaneously airing programs as they wish. In embodiments, useful, for example, users can access, in their entirety, programs that are in progress and can access programs that have previously aired. Users do not have to make a priori decisions about what programs to record because the system has the ability to store all programs on all channels.

The system can automatically store all programs each user begins to watch and can apply various policies to how programs are presented in each user's personal video guide. The system eliminates the distinction between watching on air television and watching previously recorded content.

The system enables a user to have multiple active programs, and switch back using the original program at the place they left off. In embodiments, useful, for example, the user can stop using the television altogether for a period of time and not lose this content.

The system supports personalized content assembly whereby programs are assembled from content elements for each user at the time of use. In embodiments, useful, for example, a movie could be presented to take into account a user's preferred point of view or a program could include links to video elements that provide more information about things or people of interest.

The system supports personalized interactive advertising whereby advertising is assembled from content elements for each user at the time of use. The advertising may be delivered on its own or delivered as an enhancement to other content. In embodiments, useful, for example, dated ads may be updated or replaced, ads may be personalized according to a variety of criteria, ads may provide links to other content and services; undesirable ads may be marked as such by users; ads may be delivered in response to users expressing their preferences; ads may be delivered on demand or in response to users requesting or searching for information; interacting with an ad may change how many and what kind of ads are subsequently shown; ads may be generic to all users, but interaction with an ad may be personalized; ads may be non-linear allowing users to explore aspects of the associated product or service in greater depth; and so forth.

Further aspects, features, and advantages will become apparent from the following.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
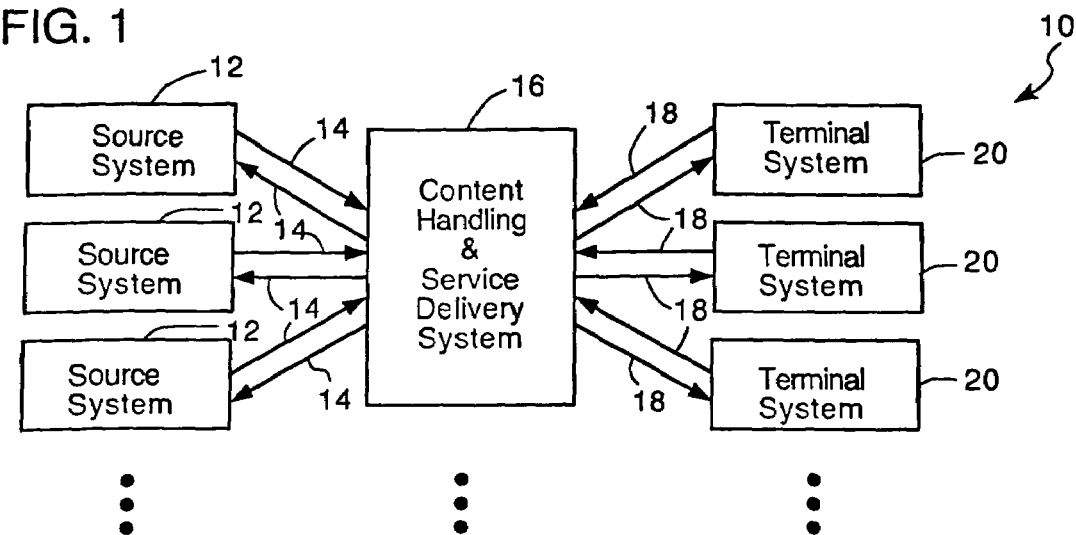
FIG. 1 is a block diagram of an exemplary content/service handling and delivery network.

Referring to FIG. 1, an exemplary content/service handling and delivery network 10 includes one or more source systems 12 linked via communication mechanisms 14 to a content/service handling and delivery system 16. The content/service handling and delivery system 16 is linked via communications mechanisms 18 to one or more terminal systems 20. The source system 12 in the network 10 provides content and/or services to the content/service handling and delivery system 16. The system 16 handles and delivers content, services, and a combination of content and services. By way of example, the system 16 within the network 10 is described using content. However, it will be appreciated that the same or similar descriptions apply to the handling and delivery of services and to the handling and delivery of a combination of content and services. Content may be any kind of data. For example, content may be audio/video and associated data, on-line or electronic documents, web pages, images, graphics, software programs and scripts, non-linear and multimedia compositions, voice, video, data calls, data messages, and so forth. Content, in its simplest form, is high production value audio/video in a variety of formats, MPEG-2, MPEG-4, Quicktime, Real, ASF, and so forth, delivered with rudimentary interactivity, pause, fast forward, rewind, bookmark, and so forth. Content is expected to evolve into increasingly rich interactive mixed media experiences though the application of a variety of technologies: World Wide Web Consortium recommendations, HTML with Cascading Style Sheets (CSS) and scripting (i.e., DHTML), Document Object Model (DOM), WebCGM, Scalable Vector Graphics (SVG), Synchronized Multimedia Integration Language (SMIL), and so forth, JavaScript, Java and Personal Java, Macromedia Flash and Shockwave, Adobe LiveMotion, ATVEF, PowerTV, Active-X, Active Server Pages, and so forth.

Content can integrate linkages to commerce transactions as well as a wide variety of on-line and off-line services: call centers, mail centers, Web sites, and such. Content may be a disassembled collection of interactive content objects that is navigated by the user or assembled by the provider in a personalized fashion for each user at the time of use. This latter case is particularly compelling as users may be interested in particular aspects of a product and not interested in others.

The terminal system 20 in the network 10 receives content and/or services from the content/service handling and delivery system 16. A terminal system 20 typically includes some combination of output devices, input devices, storages, processing elements, peripherals, and so forth. An output device is typically capable of receiving different content from a content/service handling and delivery system 16 and/or from storage and processing elements within the terminal system 20 and presenting it to one or more users (not shown). An input device is typically capable of sensing and transmitting audio, visual, manual, and/or other information to storage and processing elements within the terminal system 20 or to the content/service handling and delivery system 16. A user may be a person or group of persons using a terminal system.

In another embodiment, the content/service handling and delivery system 16 may be a source and/or terminal system for one or more additional content handling and delivery systems (not shown). Such configurations of content/service handling and delivery systems may be embodied within a content propagation and cut-though routing network described below.

The communication mechanisms 14 and 18 may include any of several methods or systems of communication. For example, the communication mechanisms 14 and 18 may include electronic, optic, and wireless busses, links, networks, packaged media, satellite and land-based wireless systems. Other examples include cable television systems, telephone systems, general and special purpose networks, the Internet, and so forth. The communications methods may include, for example, point-to-point, multicast, broadcast connection-based or connectionless-based.

The content/service handling and delivery system 16 generally mediates and handles the delivery of content and services between numerous source systems and numerous terminal systems. The content/service handling and delivery system 16 typically receives content (particularly real-time content) and services from numerous source systems 12. The content/service handling and delivery system 16 has the ability of storing, handling, and delivering of all received content from all source systems 12, provides various services, and delivers selected content and services to one or more terminal systems 20, typically in response to one or more user requests. The selected content is delivered to one or more terminal systems 20 by the content/service handling and delivery system 16 either real-time, i.e., as received by the system 16 from a source system 12, or time-shifted, i.e., delayed by some amount of time from when the system 16 begins receiving the content from a source system. The term "time-shifted" is used interchangeably with the term "stored". The content/service handling and delivery system 16 may enhance selected content and services before it is delivered to one or more terminal systems 20. Enhancement may involve processing, composition, and/or aggregation of content in response to a user request, making communications between the terminal system 20 and the content handling and delivery service system 16 interactive.

As will be described below, the content/service handling and delivery network 10 is designed to be efficient, fault tolerant, and load balanced wherein content (particularly real-time content) need only pass through the network 10 once to be stored or passed through as it is delivered to terminal systems 20. Content may be routed through one or more content/service handling and delivery systems and optionally stored or cached by those systems. Thus, users are provided access to real-time and time-shifted content as well as compositions of real-time and/or time-shifted content. For example, stored video or animated advertisements may be spliced into real-time or time-shifted content (audio/video, web pages and other documents, ATVEF, interactive graphics, and so forth), flowing through the network 10.

Figure 2:
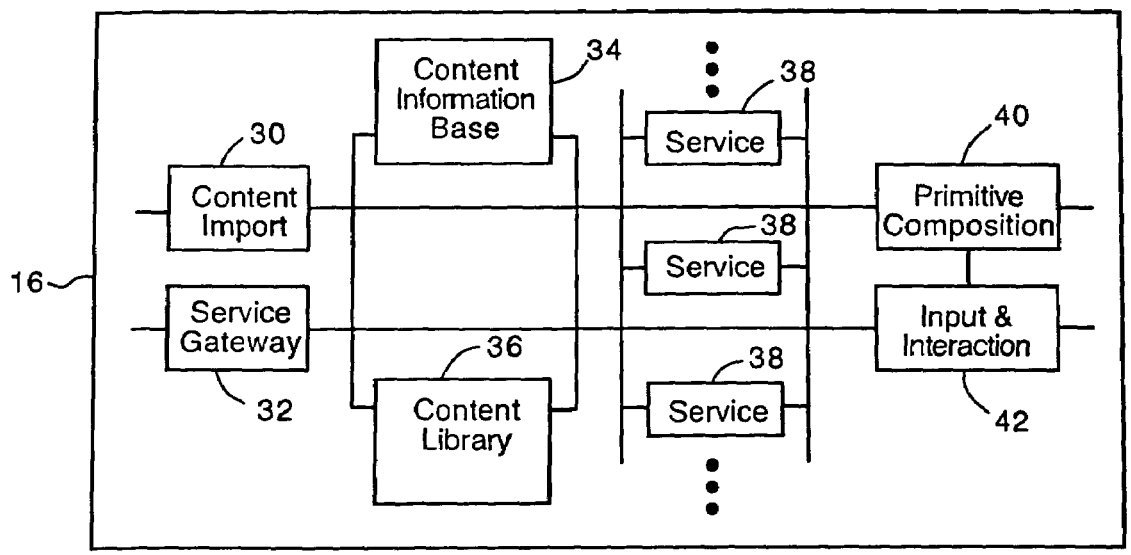
FIG. 2 is a block diagram of the content/service handling and delivery system of FIG. 1.

Referring to FIG. 2, the content/service handling and delivery system 16 of FIG. 1 includes a collection of components and data flows between components. The components include a content import component 30, a service gateway component 32, a content information component 34, a content library component 36, one or more service components 38, a primitive composition component 40, and an input and interaction component 42. All data flow are bi-directional (or multi-directional) and redundant paths do not imply redundant communications mechanisms, though in the preferred embodiment redundant communications mechanisms are used between most components to achieve scalability, fault tolerance, and load balancing. Processing elements, memories, storages, busses, and so forth may be employed by and/or shared by the various components 30, 32, 34, 36, 38, 40, and 42 in the system 16.

The content/service handling and delivery system 16 is deployed and managed for example, by an interactive television service provider to mediate the handling of content and services between numerous originators and numerous interactive television users. The content/service handling and delivery system 16 is designed, in one aspect, to include an ability to be scaled to import all content from all sources all the time, storing the content for a duration of time, and giving users real-time and time-shifted access to the content.

Figure 3:
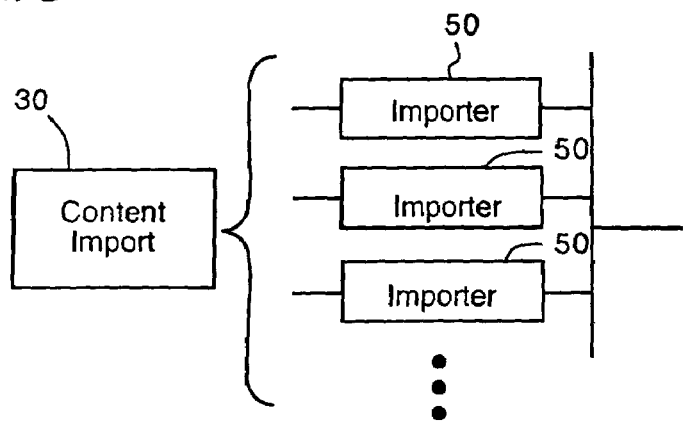
FIG. 3 is a block diagram of the content import component of FIG. 2.

Referring to FIG. 3, the content import component 30 performs content import using one or more importers 50 that are configured and managed through an operator interface (not shown) and various associated information bases (not shown). Importers 50 process and prepare content for subsequent storage and use. Analog content is encoded into a digital format. Digital content may be re-encoded, transcoded, translated, and so forth. Imported content may be communicated to other components of the system 16, including other importers.

Multiple instances of content may be received in-band (sharing a communications mechanism) or out-of-band using one or more separate communications mechanisms. Importers 50 may separate, extract, or demultiplex in-band content. Importers 50 may also mix, insert, or multiplex content communicated to them by one or more other importers receiving out-of-band content.

Multiple instances of content received in-band or out-of-band may be associated. Associated content may be received at the same time or at different times. For example, the content of a television program may contain in-band descriptive information and/or a program description may have been received earlier, perhaps the night before the program airs. To synchronize out-of-band associated content, importers 50 may be synchronized.

The content imported by one or more importers 50 may effect the operation of other importers. For example, splicing information received by one importer may be sent to another importer causing it to segment the content it is importing.

The operation of an importer 50 may effect or be effected by other system components. Typically, configuration information, program schedules and channel assignments, universal resource identifiers, and other source specifications may be used to assist the operator in managing the import of content.

Referring again to FIG. 2, content imported, generated, and/or collected by the system 16 may be stored in and/or routed through the content library 36 and content information base 34. The content library 36 generally contains content in a form that is directly presentable on an output device without intermediate interpretation or translation. The content information base 34 generally contains ancillary data required for and collected during the acquisition and use of content. The term information base is interpreted herein to mean any data or collection of data organized in any manner including data files, directories, databases, etc. Content in the content library and information in the content information base is managed by a content manager (not shown) through various management interfaces (not shown), the content information base, and possibly other information bases (not shown). The content manager controls the system 16 resources, e.g., processing, storage, communications, and so forth, used to store, forward, propagate, and route content through the system 16. The content manager also controls and monitors the caching of content in terminal systems 20.

Distinctions made here between the content library 36 and content information base 34 reflect the practice of discriminating between different forms of content and organizing those forms for optimal use. The distinctions, however, are not inherent to the system 16. Discrimination and organization of content in the preferred embodiment are expected to change over time as technologies advance (e.g., a time may come when a movie is as easy to extract from a relational database as a billing record is today).

Content is stored on one or more storages. The preferred embodiment of the content library is a content storage and cut-through forwarding system or a network of content storage and cut-through forwarding systems managed by a content propagation and cut-through routing system. By applying these storage schemes the resulting system 16 is highly scalable, fault tolerant, and load balanced. Content may be cached onto storage located in the terminal system 20. The content information base 34 may be stored and propagated in the same or in a similar manner.

When content is stored in the content library 36, the content information base 34 is generally updated to signal the content's availability. The availability of content may be signaled at any time before, during, or after content is stored in the content library 34. For example, content stored in and/or routed through a source system 12 employing the cut-through forwarding capabilities described below with reference to the content storage and cut-through forwarding system may be signaled as available in the content library 36 even though the content is not yet (or may never be) stored in the content library 36. Similarly, content stored or cached by a terminal system 20 may be signaled as available in the content library 36.

The content/service handling and delivery system 16 supports a variety of services 38. Typically, a service 38 performs a function using imported content, associated information, and user input. The resulting service output 38 is aggregated with the output of other services and delivered to one or more terminal systems 20. More generally, however, services 38 receive content and information from other components of the content/service handling and delivery system 16, perform some function, and send the result to other components of the content/service handling and delivery system 16. A service 38 may communicate with importers 50 bypassing the content library 36. A service 38 may involve multiple users whereby users communicate and collectively participate (cooperate or compete) in some activity such as a multi-user game involving a single terminal system or multiple terminal systems. A service 38 may also involve multiple users using one or more terminal systems 20 whereby users communicate and collectively participate in an activity.

A variety of hardware and software methodologies may be used to construct a service 38. A service 38 may be constructed from or interoperate with other services 38. Some services 38 may reside in the content/service handling and delivery system 16, others may reside in source systems 12 or terminal systems 20, yet others may reside in external systems accessed through service gateways 32.

The service gateways 32 provide communication between services 38 within the system 16 and services external to the system 16. Typically, the service gateways 32 are used to send reports and other messages generated by users or usage of the system 16. But, for example, a telephony or audio/video conference service may use a service gateway 32 to enable users of the system 16 to communicate to users of other systems or devices of various types.

Services 38 are managed by a service manager (not shown) through various management interfaces and information bases (not shown). The service manager controls the system 16 resources, e.g., processing, storage, communications, and so forth, used in delivering services 38 to terminal systems 20. The service manager may also inter-operate with the terminal systems 20, such as monitoring the caching and execution of services 38 in terminal systems 20.

The input and interaction component 42 receives input from a terminal system 20 and dispatches it to one or more services 38. Input is generally dispatched to the service 38 that requested it. Input may be from an input device (not shown) residing in the terminal system 20, and/or from a service 38 or other applications (not shown) residing in the terminal system 20. If multiple services 38 request the same input, or type of input, the requested input is dispatched according to a set of rules under the control of the operator. For example, the rules may specify that the input be sent to the last service requesting the input, which may use or modify the input, and/or propagate the input to other services requesting the input.

The primitive composition component 40 of the content/service handling and delivery system 40 aggregates (or otherwise composes) the output from one or more services 38 and delivers the result to one or more terminal systems 20. The aggregate may also be sent to multiple terminal systems 20. For example, a service 38 may be responsible for receiving real-time content, inserting ads into it, and broadcasting the result to all users. In this context the term aggregate is interpreted as to gather content into a mass, sum, or whole. This includes, but is not limited to, replacing, inserting, multiplexing, splicing, and composition of content to be sent to one or more terminal systems over various communications mechanisms.

As mentioned above, users use the terminal system 20 to interact with content and services provided by the content/service handling and delivery system 16. Input received from the terminal system 20 is dispatched to one or more services 38. Content and other data sent to the terminal system 20 may be used by services 38 and applications residing in the terminal system 20 and/or presented to one or more users. In an embodiment, the terminal system 20 dynamically caches content or services (or components thereof) to increase system 10 efficiency.

Figure 4:
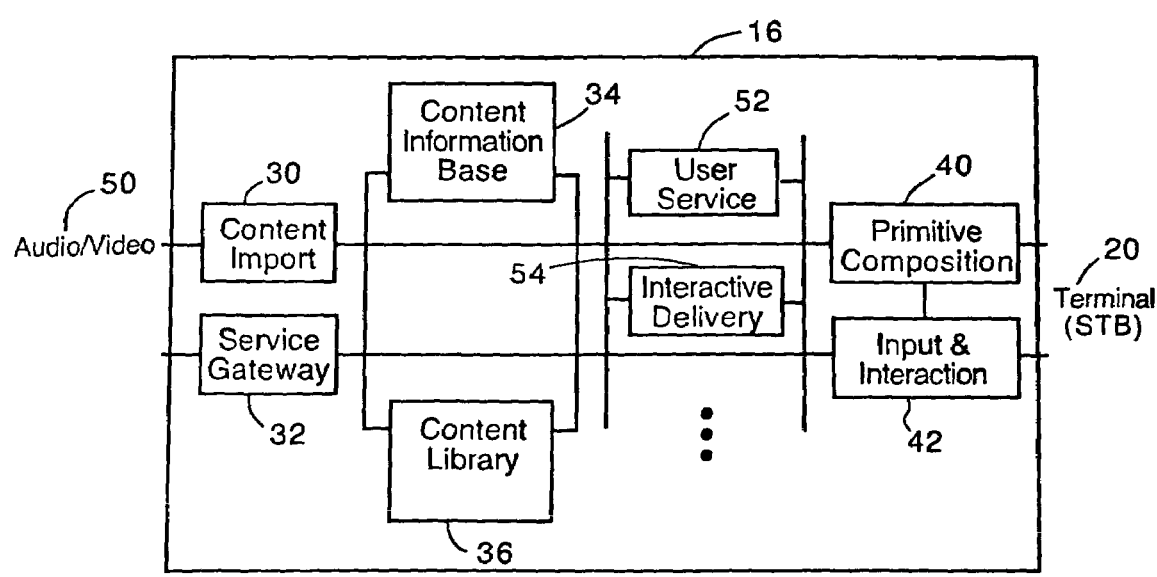
FIG. 4 is a block diagram of exemplary content/service handling and delivery system for interactive delivery of real-time and time-shifted audio/video content.

Referring to FIG. 4, a content/service handling and delivery system 16 for interactive delivery of real-time and time-shifted audio/video content is shown. In a preferred embodiment, content is stored in a content storage and cut-through forwarding system, described below, or a network of content storage and cut-through forwarding systems managed by the content propagation and cut-though routing system. This is but one aspect of the system 16 and is described as one example. Other aspects are described below.

The content/service handling and delivery system 16 imports analog and digital audio/video content 50. Various methods of encoding may be utilized, such as MPEG-2, MPEG-4, Quicktime, Real, ASF, and so forth, delivered with rudimentary interactivity, pause, fast forward, rewind, bookmark, and so forth. Content is expected to evolve into increasingly rich interactive mixed media experiences though the application of a variety of technologies: World Wide Web Consortium recommendations, HTML with Cascading Style Sheets (CSS) and scripting (i.e., DHTML), Document Object Model (DOM), WebCGM, Scalable Vector Graphics (SVG), Synchronized Multimedia Integration Language (SMIL), and so forth, JavaScript, Java and Personal Java, Macromedia Flash and Shockwave, Adobe LiveMotion, ATVEF, PowerTV, Active-X, Active Server Pages, and so forth. The system could have as few as one audio/video importer within the content import component 30 allowing for the import of content from one source at a time. Importers can be added to the system 16 to allow the simultaneous import of content from multiple sources or to provide redundancy and fault tolerance. The efficiency, load balancing, and fault tolerance of the preferred embodiment supports large scale deployments where one or more importers are dedicated to each content source, thus enabling the simultaneous import (and delivery) of content from numerous sources.

An example terminal system 20 includes a set top box that communicates with and controls a television. Typically the system 20 will also include a remote control device and other devices. The content/service handling and delivery system 16 has a default service for each user. This is referred to as a user service 52. The user service 52 presents a user interface to the user on the terminal system 20 and provides access to services on the content/service handling and delivery service system 16. The user service 52 queries various information bases to ascertain what services are available to a user and enables the user to invoke services. In this example only an interactive delivery service 54 is shown. The user service 52 also collects and maintains information associated with users and usage of services. This may include, but is not limited, to such things as user account, registration, and profile information, billing and payment information, preferences, content and service subscriptions, permissions, and restrictions, past and pending service requests, a personalized guide to content in the content library, collected usage information, and so forth.

The interactive delivery service 54 provides users with interactive access to content available through the content/service handling and delivery system 16. The interactive delivery service 54 queries the content library 36, content information base 34, and various other information bases (in particular, user and usage information) to generate personalized guides, listings, and recommendations pertaining to content available through the content/service handling and delivery system 16. Users interact with the interactive delivery service 54 to select content for delivery. Delivery may commence immediately or be is scheduled for some later time. If the user requests to use content that is not yet available, the interactive delivery service 54 may signal the terminal device 20 when the content becomes available or display such things as a timer indicating how long before the content will be available along with ads, promotions, or other kinds of content appropriate to the situation.

In general, content is delivered to a user as follows. The interactive delivery service reads content through the content library 36 and sends it to the primitive composition component 40 to be added to one or more aggregates of content being sent to one or more terminal systems 20. Delivery of real-time content is accomplished using the content storage and cut-through forwarding system, described below, or by services bypassing the content library to communicate directly with importers 50. Real-time content may also stored in the content library 36 for subsequent time-shifted delivery.

Users interact with the interactive delivery service 54 in various ways. Pause, fast-forward, rewind, start, and start are supported for content where such controls are appropriate, e.g., streaming media. It should be appreciated that the specific methods of interaction described below may be modified or applied to any sort of interactions involving any sort of content and/or services. If a user on a terminal system 20 is receiving real-time content and pauses or rewinds the content, the content/service handling and delivery system 16 transitions seamlessly from delivering content real-time to delivering it time-shifted from the content library 36. If a user is viewing time-shifted content and fast-forwards to the end of what has been stored in the content library 36, the content/service handling and delivery system 16 seamlessly transitions from delivering the time-shifted content to delivering the content real-time.

Users may interact with the interactive delivery service 54 through the terminal system 20 to stop the delivery of content and bookmark it for later use. In response, the interactive delivery service 54 queries and modifies user and usage information in a user information base (not shown).

The interactive delivery service 54 may collect usage information and save this information in a user information base. This usage information may be used to affect subsequent behavior of the interactive delivery service 54 to the user. For example, different content recommendations may be made to a user based upon their prior usage patterns or the usage patterns of other users.

Figure 5:
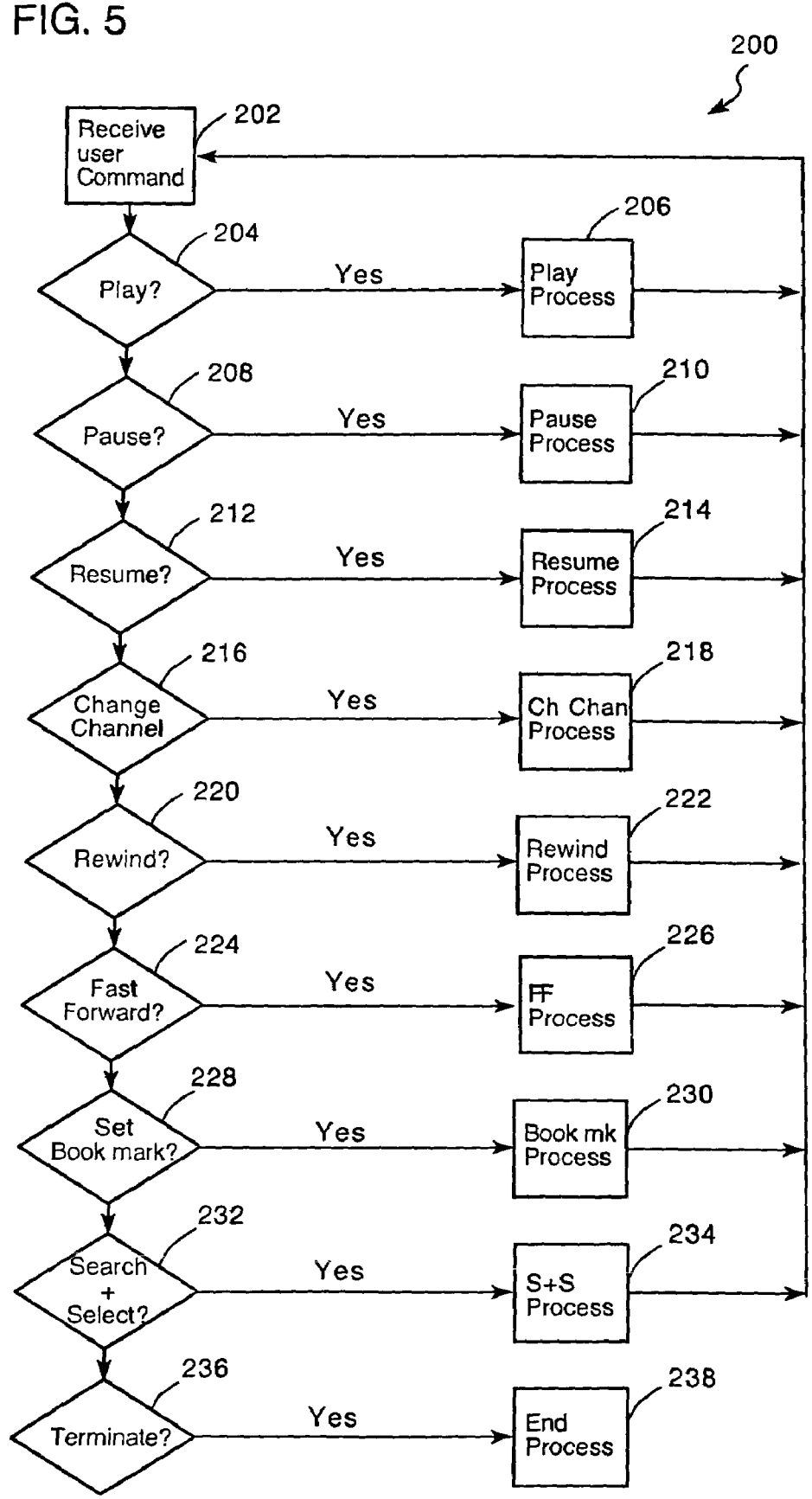
FIG. 5 is a flow diagram of a content handling process.

Referring to FIG. 5, a content/service handling process 200 residing in the system 16 and associated with the interactive delivery service 54, for example, includes receiving 202 a user command. As mentioned above, the user typically enters a command through a set top box connected to a display unit in the terminal system 20. In an embodiment, user commands may be entered using a wireless device. The process determines 204 if the user command is a "play" and executes 206 a play process if so. The process determines 208 if the user command is a "pause" and executes 210 a pause process if so.

The process 200 determines 212 if the command is a "resume" and executes 214 a resume process. The process 162 determines 216 if the command is a "change channel" and executes 218 a change channel process. The process 162 determines 220 if the command is a "rewind" and executes 222 a rewind process. The process 162 determines 224 if the command is a "fast forward" and executes 226 a fast forward process. The process 162 determines 228 if the command is a "set mark" and executes 230 a set mark process. The process 162 determines 232 if the command is a "search and select" and executes 234 a search and select process. The process 162 determines 236 if the command is a "terminate" and executes 238 a termination process.

Figure 6:
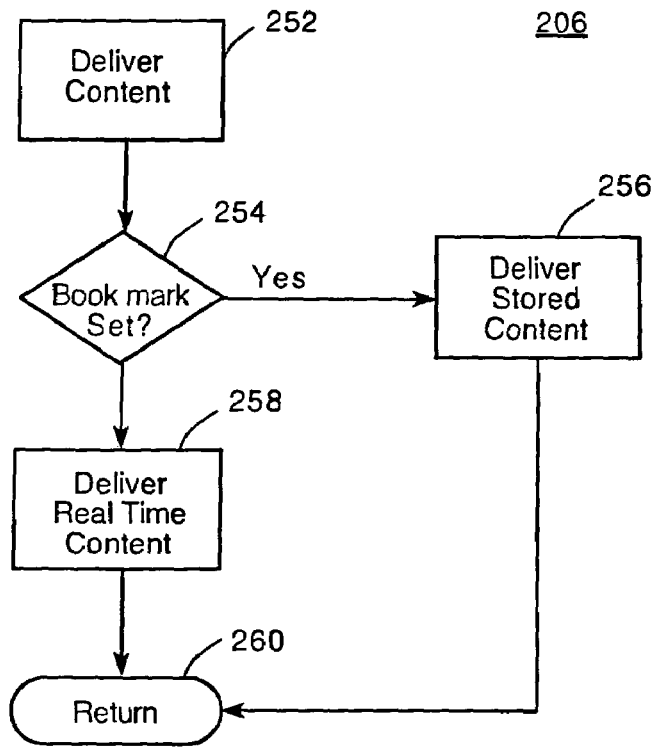
FIG. 6 is a flow diagram of a play process.

Referring to FIG. 6, a play process 206 includes the interactive service delivery delivering 252 content through the content library and to the terminal system. The process 206 determines 254 whether there is a bookmark set for the user and delivers 256 recorded content to the terminal system if a bookmark is set. If not, a bookmark is set for the user, the process 206 delivers 258 real-time content passing through (or bypassing) the content library to the terminal system and returns at 260.

Figure 7:
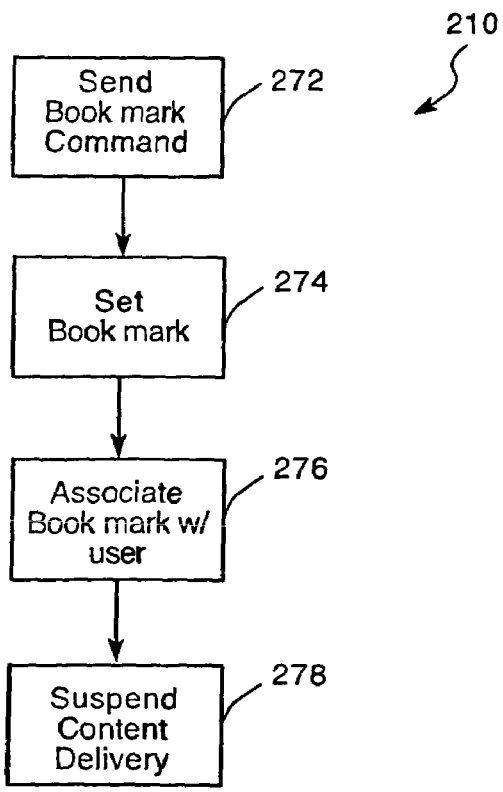
FIG. 7 is a flow diagram of a pause process.

Referring to FIG. 7, a pause process 210 includes the interactive delivery service sending 272 a bookmark instruction to the user service. The user service sets 274 a bookmark in its user information base. The process 210 associates 276 the user with the bookmark in the user information base and the interactive delivery service suspends 278 the delivery of content to the terminal system, i.e., real-time or time-shifted.

Figure 8:
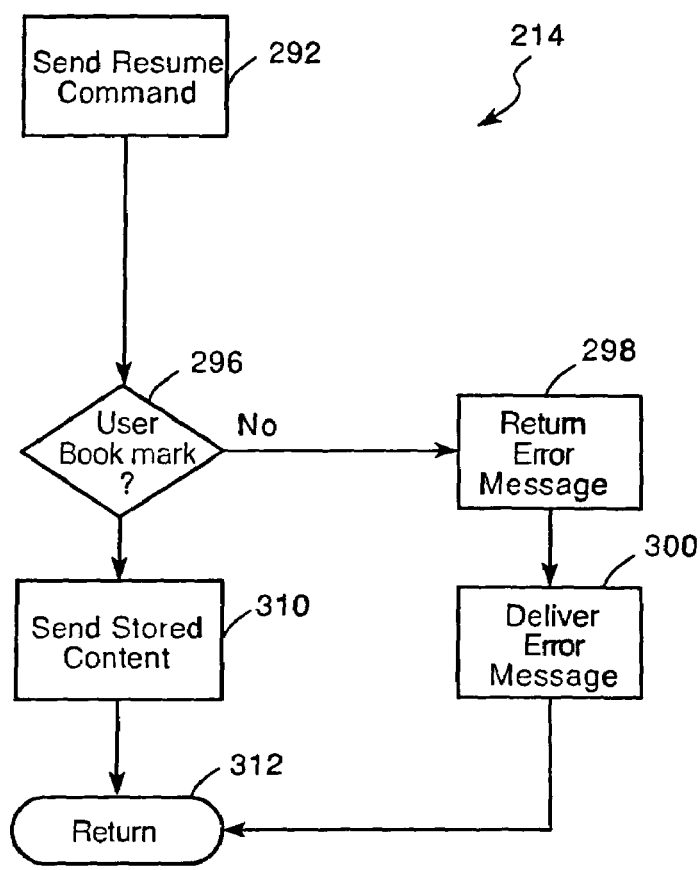
FIG. 8 is a flow diagram of a resume process.

Referring to FIG. 8, a resume process 214 includes the interactive delivery service sending 292 a resume command to the user service for the user. The process 214 determines 296 if the user is found. If the user is not found, an error message is returned 298 to the interactive delivery service and the error message is sent 300 to the user using the interactive delivery service. If the user is found, the interactive delivery service locates content associated with the user and delivers 310 the content from the content library 36 to the terminal system. The process 214 returns at 312.

Figure 9:
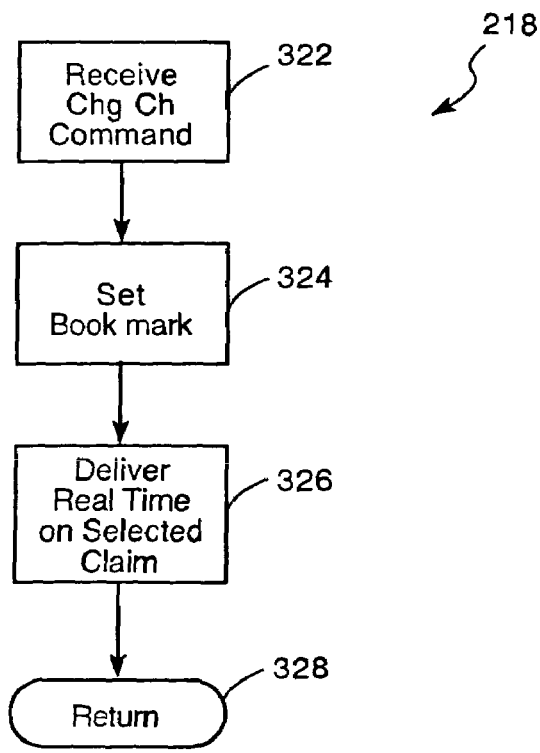
FIG. 9 is a flow diagram of a change channel process.

Referring to FIG. 9, a change channel process 218 includes the interactive delivery service receiving 322 a change channel command. The interactive delivery service sets 324 a bookmark for the user at the current channel as described above. The interactive delivery service delivers 326 real-time content being broadcasted on the selected channel. The process 320 returns at 328.

Figure 10:
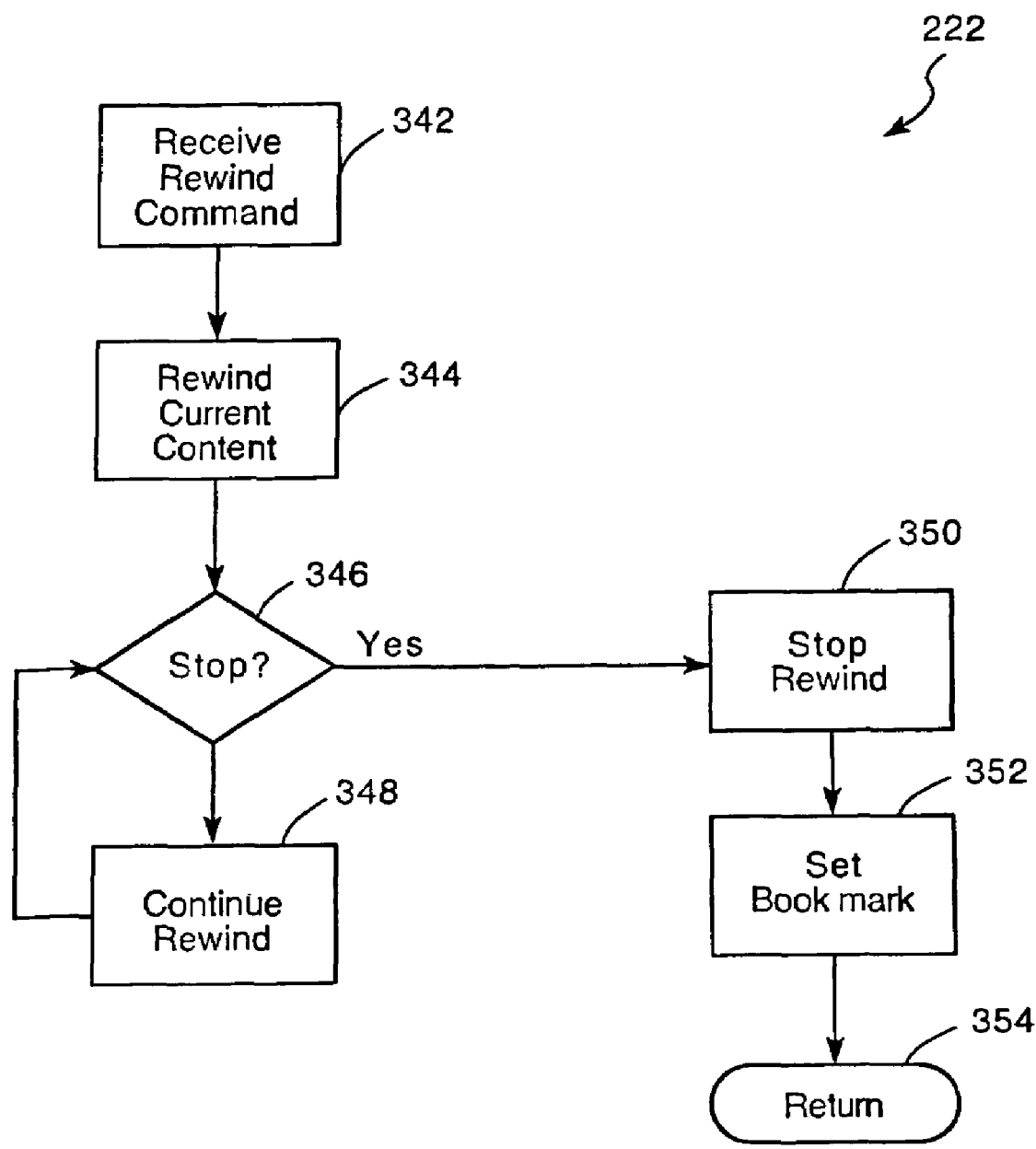
FIG. 10 is a flow diagram of a rewind process.

Referring to FIG. 10, a rewind process 222 includes the interactive delivery service receiving 342 a rewind command. The interactive delivery service starts 344 rewind delivery of content (i.e., content, possibly excerpted or modified, delivered in reverse order) for the selected content for the user associated with the interactive delivery service. The process 222 determines 346 whether a stop command was received, and if not, continues 348 rewinding. If a stop command is received the interactive delivery service stops 350 the rewinding of content for the user. The interactive delivery service sets 352 a bookmark as described above. The process 222 returns at 354.

Figure 11:
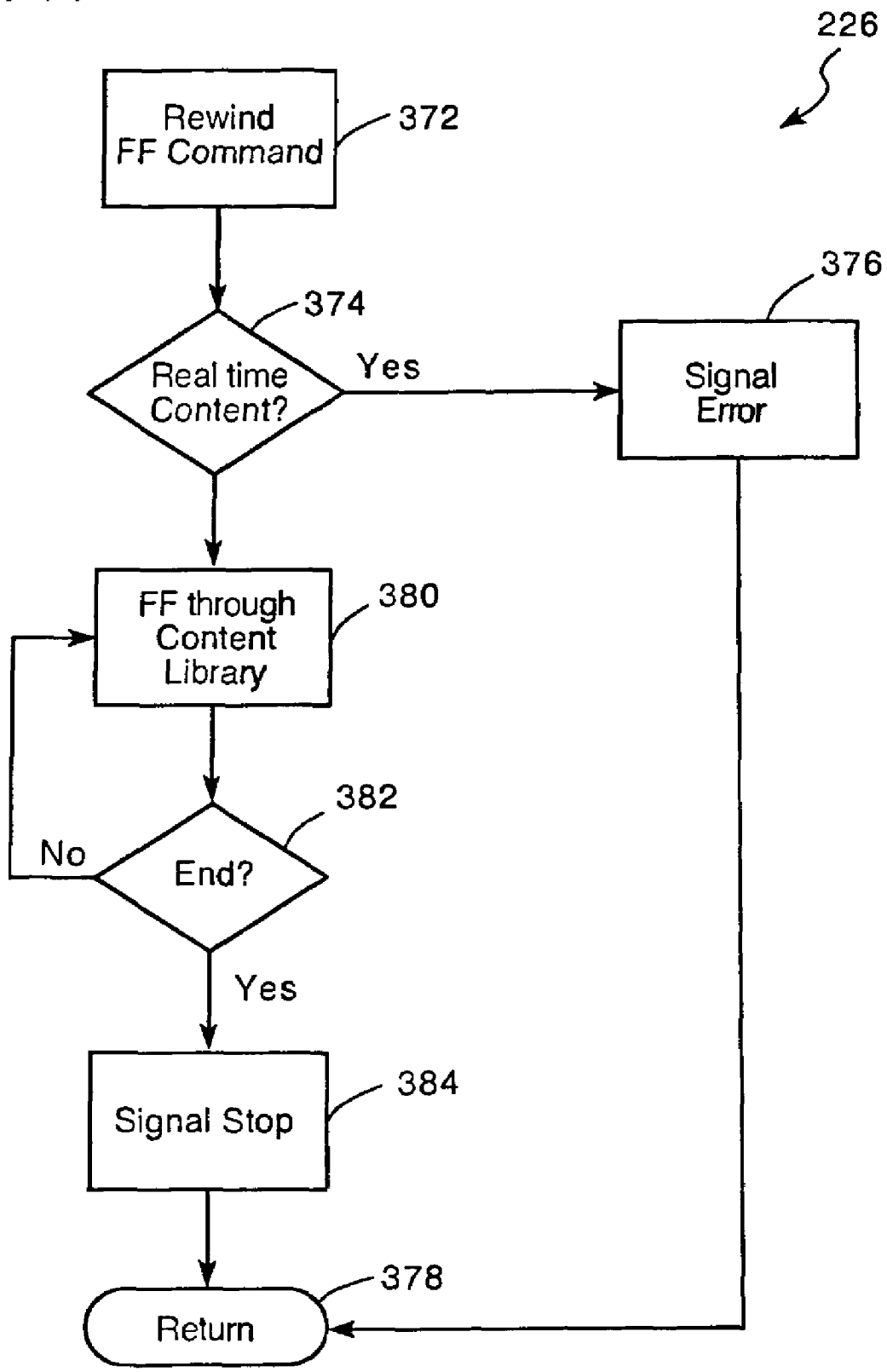
FIG. 11 is a flow diagram of a fast forward process.

Referring to FIG. 11, a fast forward process 226 includes the interactive delivery service receiving 372 a fast forward command. The process 226 determines 374 whether the content is real-time. If the content is real-time, the process 226 signals 376 a user error and returns 378. If the content is not real-time, the interactive delivery service starts 380 fast forward delivery of content (i.e., content, possibly excerpted or modified, delivered in faster than real-time) 380 from the content library. The process 226 determines 382 whether the stored content being fast-forwarded is at its end. If the recorded content is not at its end the interactive delivery service continues to fast forward 380 through the stored content in the content library. If the stored content is at its end, the process 226 signals 384 a stop to the user. The process 226 returns at 378.

Figure 12:
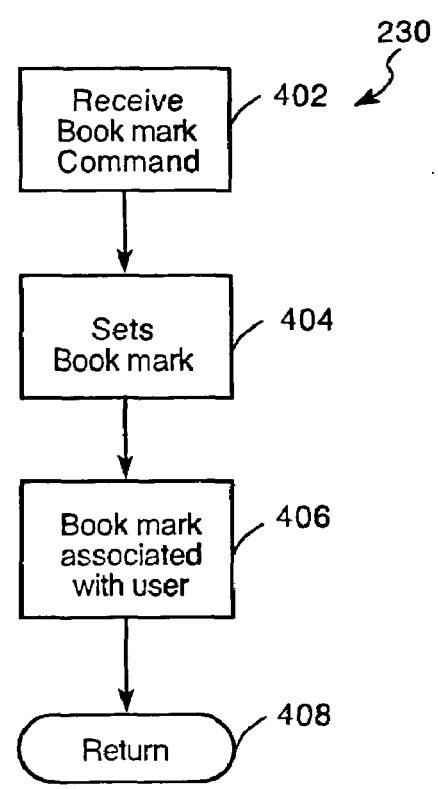
FIG. 12 is a flow diagram of a set mark process.

Referring to FIG. 12, a mark process 230 includes a interactive delivery service receiving 402 a set mark command. The interactive delivery service sets 404 a mark and instructs 406 the user service to associate the mark with the user. The process returns at 408.

Figure 13:
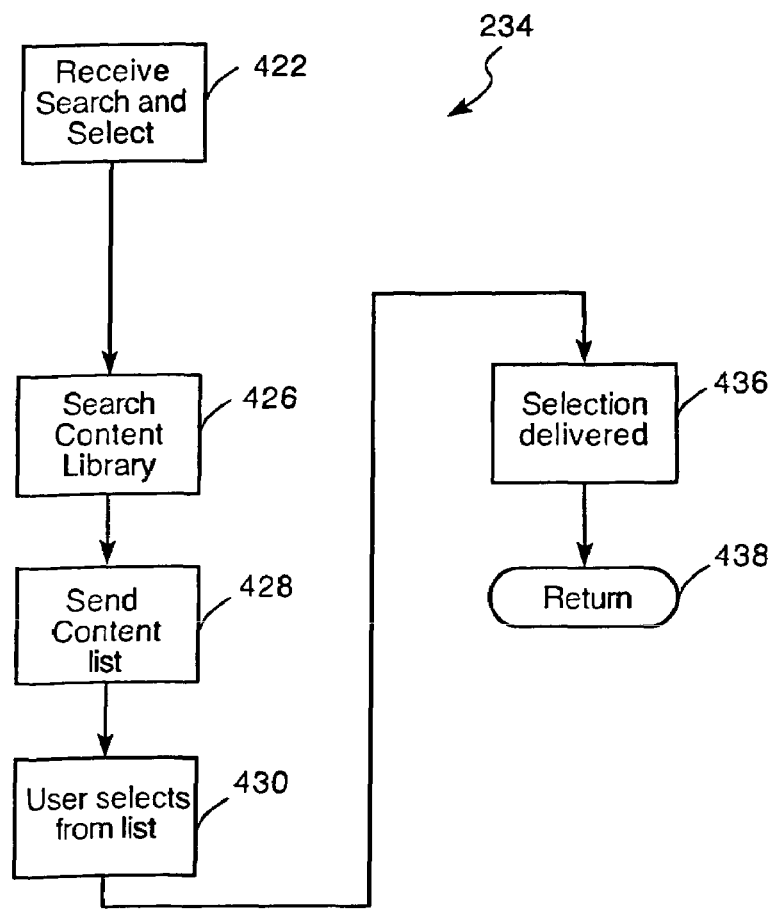
FIG. 13 is a flow diagram of a search and select process.

Referring to FIG. 13, a search and select process 234 includes the interactive delivery service receiving 422 a search and select command. The interactive delivery service searches 426 the content library for stored content and queries the user information base for marks and other information related to content usage. The interactive delivery service sends 428 a personalized list of titles to the user. The user sends 430 a selection choice to the interactive delivery service. The interactive delivery service begins delivering 436 the content for the selected choice through (or bypassing) the content library and returns at 438.

Figure 14:
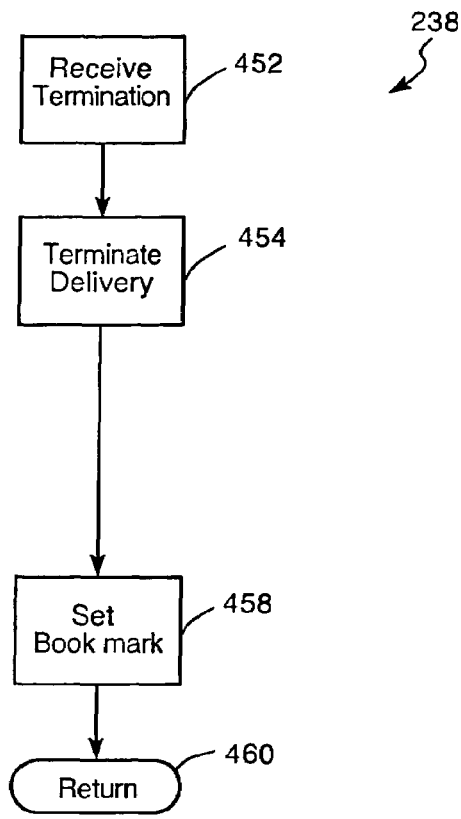
FIG. 14 is a flow diagram of a termination process.

Referring to FIG. 14, a termination process 238 includes the interactive delivery service receiving 452 a termination command. The interactive delivery service terminates 454 content delivery to the user and sets 458 a bookmark as described above. The process 450 returns at 460.

In an embodiment, the interactive delivery service may collect usage information. The information may effect the subsequent behavior of the interactive delivery service. For example, different content recommendations may be made to a user based upon their prior usage patterns or the usage patterns of others. The information may be communicated to external services through service gateways 32. For example, the interactive delivery service (or a service cooperating with the interactive delivery service) may present users with the option to buy collateral product and services (for example, the sound track for a movie they are watching) and generate messages to an external order processing center in response to user selections.

An embodiment supports time-shifted, real-time or both modes of delivery, but does not support a seamless transition between the two. In such embodiments, the availability of content for time-shifted delivery may be slightly or substantially delayed from when content is imported by the system.

Another embodiment supports only time-shifted delivery of content. The cut-through features of the underlying system may be employed to reduce delay in content availability. Real-time services may be delivered to terminal systems through a service gateway or via communications mechanisms external to the system.

In still another embodiment, the service features of the system are used to collect information on who is using what content even if the content is not flowing through the system (e.g., monitor who is watching what television broadcast channels even if the system isn't used for broadcast services). Such information may be used for example to decide upon what advertising to insert into the content even if the ad insertion system or process is external to the content/service handling and delivery system.

Figure 15:
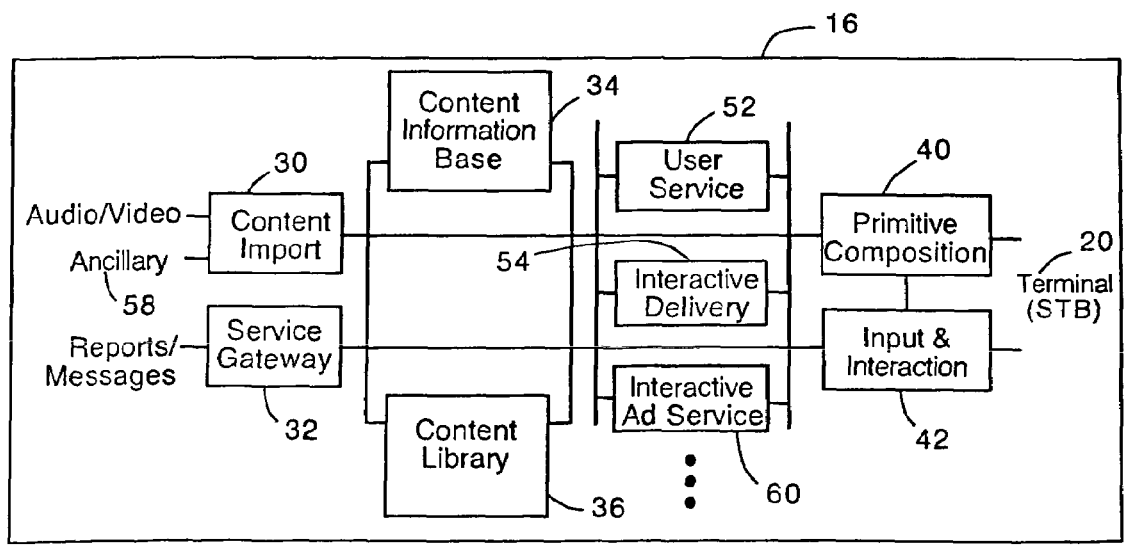
FIG. 15 is a block diagram of exemplary content/service handling and delivery system for interactive advertising content and services.

Referring now to FIG. 15, a content/service handling and delivery system 16 adapted to provide interactive advertising content and services is shown. In a preferred embodiment, content is stored in a content storage and cut-through forwarding system, described below, or a network of content storage and cut-through forwarding systems managed by the content propagation and cut-though routing system described below. This is but one aspect of the system 16. Other aspects are described below.

Import in the content import component 30 is extended to include content associated with advertising: advertising content (copy) and data used by advertising related services to associate advertising content with other content.

Ancillary data importers 58 import analog and digital data associated with content imported by one or more content importers in the content import component 30. Examples of ancillary data include but are not limited to splice data, content identification, description, origination information, event triggers, enhancement information, available advertising times and spaces, input and interaction times and spaces, and so forth. In an embodiment this may be accomplished using fixed or implicit schemas for the import of a specific kinds of ancillary data. In other embodiments, it may be accomplished by using an extensible set of schema for the generalized import of ancillary data.

In an embodiment, an ancillary data importer (splice importer) is used to import analog and digital splice data (cues, schedules, etc.) associated with content imported by one or more audio/video importers. Splice data may be conveyed in-band with or out-of-band from its associated content. Typically, splice data (audio "cue-tones"), contact closures, SCTE standard DVS-253, VBI data, ATVEF (Advanced Television Enhancement Forum), text data, XML data, or other header/descriptor formats) is encoded (analog) or re-encoded (digital) into a common internal format. To maintain synchronization between out-of-band data and their associated content, splice data importers are synchronized with their associated content importers. In-band splice data is copied or cut from its associated content, processed, and/or (logically) forwarded to splice data importers to be processed as described above.

Splice importers send splice data to the content information base 34 where it is stored and/or forwarded to one or more requesting services 38 for use in delivering ads or ad services in conjunction with the associated content. Splice data from splice importers or from the content information base 34 may be used by content importers to modify the import of associated content (e.g., splice data sent to MPEG encoders may cause them to end sequences and insert I-Frames to create clean splicing points in the content). This allows for splice data to be imported at the same time as its associated data or at some earlier or later time.

The ancillary data import mechanism is also used to import trigger and enhancement information defined in ATVEF (and other such mechanisms). This information is used replace general (or default) enhancements with localized and personalized enhancements.

The preferred embodiment is flexible and has the ability to change over time to accommodate advancements in technology. For example, digital methods are expected to supplant analog methods for representing and conveying content and its associated data; in-band splice signaling is expected to supplant out-of-band signaling methods; the general practice of splice cueing is expected to be supplanted by content formats in which content and ancillary data is structured into self-identified, self-described components. To accommodate these trends the separate content importers and ancillary data importers in the content import component 30 described above are replaced by integrated and generalized importers whereby the content information base 34 is populated with information extracted directly from content and/or derived from its structure.

Advertising services are provided in an Interactive Advertising Service (IAS) 60. The IAS 60 commonly cooperates with other services 38 to enhance those services with advertising capabilities. The IAS 60 may read ad content from the content library 36 and use it to modify an aggregate of content being delivered to one or more terminal systems 20. It may also communicate to other services 38 what advertising content (copy) to include in the delivery of their service. For example the IAS 60 cooperates with the interactive delivery service 54 to insert, replace, aggregate, compose, and so forth, the interactive content delivery with advertising.

The IAS 60 is generally responsible for placement and presentation of advertising to one or more users of one or more terminal devices 20. The opportunity to present advertising to one or more users is considered "inventory" and inventory has many attributes (user or users, time, space, and so forth). Inventory is commonly associated with the delivery of other content and services, though it may also stand alone. For example, a user may request the delivery of content describing a product. Inventory may be known in advance, for example, a specification of where and when ads may be displayed in a TV program or web page. Inventory may also appear dynamically (dynamic inventory) when a user begins using a service in the system, for example, when a user begins time-shifted viewing of a TV program.

In some embodiments, the content/service handling and delivery system 16 may import content from an advertiser's content propagation and cut-through routing network such that and when users begin using a service, content from the advertiser is immediately presented to the user.

The IAS 60 binds advertising to inventory using one of a variety of methods. One aspect is its support for binding advertising to dynamically appearing inventory. Typically, it applies dynamic and late binding approaches such that the binding (or final binding) is made "just in time" before inventory is consumed. This allows a binding function to incorporate the maximum possible amount of information related to the binding decision, thus allowing for optimal results (maximizing the value and minimizing the cost of presenting an ad). The binding function incorporates one or more factors including but not limited to user and usage information, information about available advertising, its useful lifetime, its intended audience, information about the content and service with which the advertising is to be associated, time and date information, information about events effecting users and their usage (e.g., news of a snow storm), expressed user preferences and/or requests for product or service information, advertiser agreements, placement schedules, and so forth.

Another aspect of the IAS 60 is its support for "intelligent or self guided ads" that contain information, instructions, procedures, and possibly software programs that interface with the IAS 60 in search of optimal binding. A specific example is for ads to have embedded or associated Java programs and for the IAS 60 to provide a Java run time environment along with an advertising interface package through which the ad can discover inventory, user information, and other information to be factored into a binding decision. The result is typically treated as a hint or recommendation that the IAS 60 may either accept or ignore.

The binding function may be used to compile a set of ads for each user—each ad in the set has a computed value specific to that set. For inventory involving an individual user, the IAS 60 inspects the set of ads associated with that user and binds the ad with the greatest value matching the parameters of the inventory. Inventory parameters include such things as content type, screen size and location, duration, and so forth. So, for example, video ads would not be placed with inventory accommodating only text or still images. For inventory involving multiple users, the IAS 60 inspects the set for each user and the ad common to all sets with the greatest average value is used. Other statistical criteria may also be used. This mechanism supplants the current (generally manual) practice of statically binding advertising to content as a means of reaching an estimated demographic. Here the demographic as well as the expressed interests of users (and other information) is explicitly factored into the valuation.

In the near term, due to constraints in processing, storage, and/or communications, the IAS 60 may pre-compute all or part of the function described above. The pre-computation would be performed periodically or in response to events such as when new advertising content is imported. The pre-computation generally uses a subset of factors such as user demographic information, user preferences and requests, and information about available advertising and its intended audience (all of which is known well in advance of dynamically appearing inventory). When inventory appears and at various time before it is consumed additional computations may be applied before a final binding decision is made.

In general, services communicate with the IAS 60 to deliver or assist in the delivery of ads. They also communicate with the IAS 60 to respond to user input related to the delivery of ads and to track and report on the delivery and use of ads.

The IAS 60 may use ancillary data stored in the content information base 34 to sequence or synchronize the delivery of ads during the aggregation and delivery of associated content. It may also use ancillary data to aggregate content in advance. A specific example of the latter is when the IAS 60 uses splice data to segment content in the content library. Segmentation is done directly by modifying the content or indirectly by modifying how content is incorporated or referenced by other content.

The interactive delivery service 54 described in the previous example may communicate with the IAS 60 before, during, and after it delivers content. The IAS 60 tracks inventory in the content, binds ads to inventory, and causes those ads to be added to one or more aggregates of content as required by the parameters of the inventory. A specific example of this process is when the interactive delivery service 54 is about to deliver segmented (or structured) content: the interactive delivery service 54 communicates with the IAS 60 to replace segments and possibly add segments containing ads (as described above, this may be done directly by the IAS 60 adding content to the appropriate aggregate(s) or indirectly by the interactive delivery service 54 using the IAS 60 to modify the structure of content it is or is about to deliver)—specifically it replaces ads that have lost value with respect to other available ads—and this process may be repeated at various times during the delivery of a sequence thus allowing for a revaluation of the ads to be delivered. Terminal system input and interaction (e.g., user input and interaction) or other events may change the value of ads in the set of ads compiled for a user.

Terminal system input (e.g., user input) associated with the delivery of ads is dispatched to the IAS 60. The IAS 60 may also examine terminal system input not associated with advertising. IAS 60 response to terminal systems input depends on a number of factors such as type of ad eliciting the input, parameters of the inventory, service polices, consumer preferences and requests, provider policies, and so forth.

The IAS 60 may incorporate the information into the valuation of ads and/or use the information to send messages and reports to external services via a service gateway.

A specific example of how the IAS 60 may respond is when a user interacts with an ad using a television remote control: depending on the type of input, the IAS 60 may suspend and/or modify the content and services being delivered. In particular, it may cause the delivery of some content to suspend and cause the delivery of other, ad related, content to begin. Alternatively, it may trigger advertising in the form of enhancements to be delivered (e.g., ATVEF). It may modify user information, for example, to note a user's expressed interest or disinterest in an ad. It may also generate and send reports or other kinds of messages to external entities using the service gateway 32, for example, to execute a purchase or to have an advertiser contact the user (e.g., by mail or by phone call). Any communications mechanism may be used. The preferred embodiment may employ a variety of standards and practices to achieve secure and non-repudible communications to authenticated entities. For example, an extranet designed for the purpose of trafficking interactive advertising content and services (advertising extranet) may be utilized.

The IAS 60 also presents a user interface to users allowing them to express their advertising preferences and to request advertising related content and services. In particular, the IAS 60 allows users to request product information. This may be done in a variety of ways including presenting users with product categories to select from, by structured expression (search expressions), and by free form expression (natural spoken or written language).

Though implied above, the IAS 60 is also responsible for binding ads to inventory associated with various user (and operator) interfaces presented by other components of the system 16. For example, the user service 52 and interactive delivery service 54 would communicate with the IAS 60 to place ads in their user interfaces (UIs).

The IAS 60 generates reports and other messages related to the use of interactive advertising and uses one or more service gateways 32 to communicate this information to external entities (e.g., content originators and advertisers). For example, this mechanism may be used to report on the use of interactive ads or it may be used to enable users to request further information, a callback from the advertiser, or linkage to other on-line services.

Figure 16:
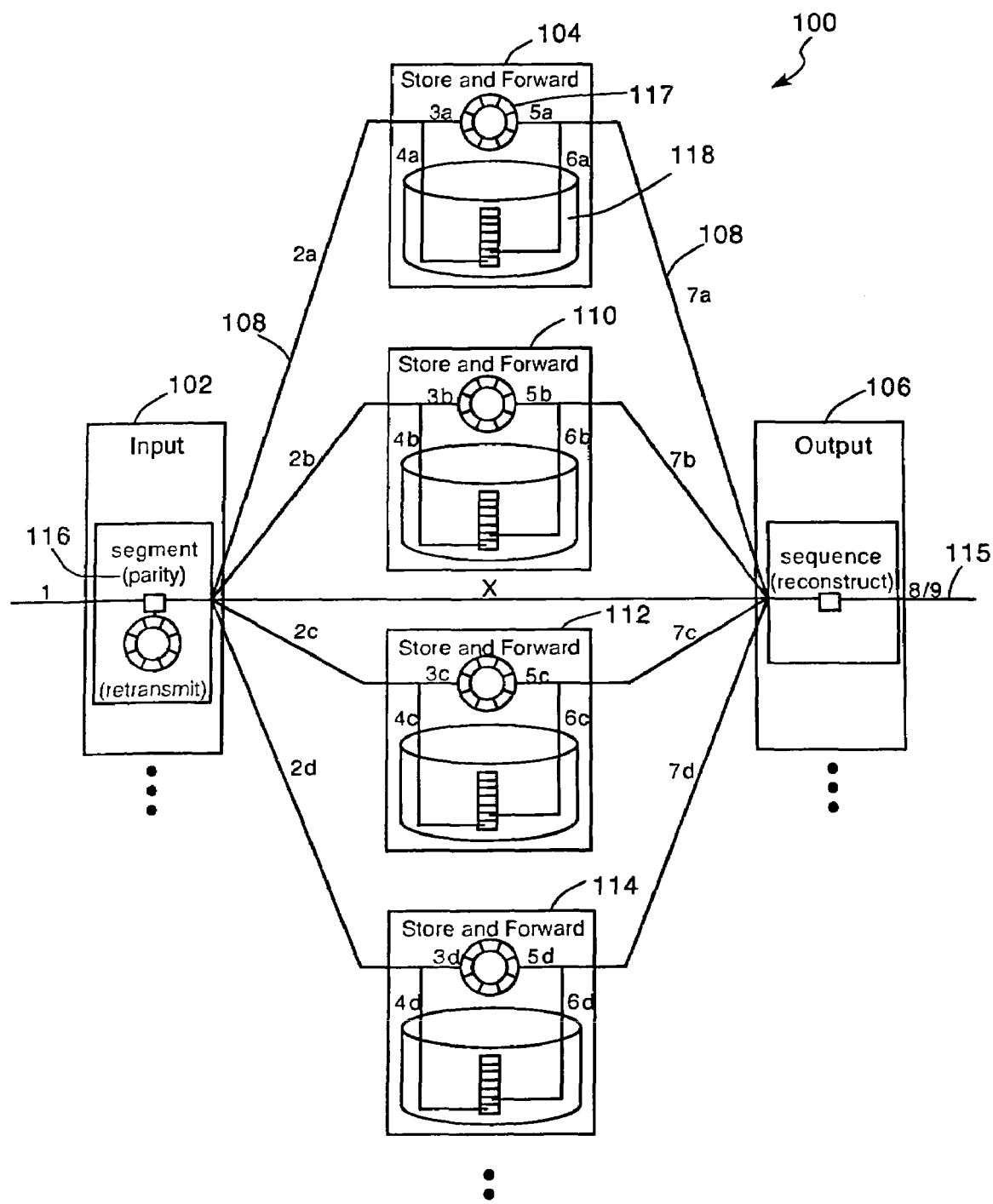
FIG. 16 is a block diagram of a content storage and cut-through forwarding system utilized in the content/service handling and delivery system of FIG. 2

Referring now to FIG. 16, a content storage and cut-through forwarding system 100 includes at least one input element 102, at least one store and forward element 104, and at least one output element 106. Each of the elements 102, 104, and 106 are interconnected by one or more communication link mechanisms 108. Processing elements, memories, storages, busses, and so forth may be employed by and/or shared by various elements 102, 104 et al, and 106 in the system. The content manager described above controls the various elements, through management interfaces (not shown), to setup, monitor, and tear down flows of content in the system.

In a preferred embodiment, input 102 and output 106 elements are integrated with store and forward elements such that a store and forward elements may be accompanied by one or more integrated inputs, one or more integrated outputs, a combination of integrated inputs and outputs, or neither. Typically, multiple input and output elements are integrated and distributed across multiple store and forward elements to load balance input and output traffic across the system 100, to increase system fault tolerance by providing redundant input and output data paths, and to gracefully degrade service when store and forward elements fail by also removing a source of load on the system (inputs and outputs).

Elements in the content storage and cut-through forwarding system 100 communicate using one or more communications mechanisms 108. Though communications in the content storage and cut-through forwarding system 100 may be described as request/response transactions, any of a variety of methods could be used. In some embodiments, state associated with a data flow through the system would be "lazy bound" (creating virtual or implicit connections) and persist for the duration of the data flow. When a data flow is terminated or modified, state would be deleted explicitly or garbage collected at some later time.

Each input element 102 receives content through a communications mechanism, and segments (if prescribed), according to a defined method, the content and computes redundancy information in a parity engine 116. The preferred embodiment uses the segmentation and redundancy methods defined for RAID-5. Other embodiments may apply the methods defined for RAID-0, RAID-1, RAID-2, RAID-3, RAID-4, and RAID-6 systems, non-RAID systems, hybrid storage subsystems, and so forth. Some of these other embodiments do not include segmentation. The input element 102 distributes the content segments and redundancy information to one or more store and forward elements 104, 110, 112 and 114. The input element 102 may also buffer content segments and retransmit the content segments on demand or in response to failures in one or more store and receive elements 104, 110, 112 and 114. The content segments may be buffered by computing a time window within which content segments are held in a retransmission buffer.

In another embodiment, buffer storage may be conserved by detecting element failures and using the information to determine which content segments to retransmit without first putting them in the retransmission buffer.

Each store and forward element, store and forward element 104, for example, receives content segments from the input element 102, buffers the content segments in a buffer 117 and stores the content segments in a local storage subsystem 118. The store and forward element 104 responds to requests to read content segments by either retrieving the requested content segments from the buffer 117 or by retrieving the requested content segments from the local storage subsystem 118.

Any type of buffer 117 or cache may be used. In a preferred embodiment, a ring buffer is utilized because it efficiently supports a writer and multiple asynchronous readers of sequential data. In some embodiments, the buffer is sized to allow for a smooth graduation of delays through the system 100. In other embodiments, a smaller buffer size is utilized. Buffer size may be measured in units less than, equal to, or greater than the size of a content segment.

The local storage subsystem 118 is preferred to be fault tolerant and load balanced, using RAID-5, though other storage methods could be used: RAID-0, RAID-1, RAID-2, RAID-3, RAID-4, and RAID-6 systems, non-RAID systems, hybrid storage subsystems, and so forth.

Each output element 106 reads content segments from one or more store and forward elements, checks for errors, and outputs the content over a communication mechanism 115. Depending on the segmentation and redundancy method applied by the input element 102, the output element 106 may sequence the segments (if necessary) to reassemble the original content and, in the case of errors, reconstructs the missing or erroneous content.

If an error occurs, e.g., a read request fails or a segment is corrupted or missing, an output element 106 does one of two things to reconstruct the content. First, the output element 106 may, in accordance with the defined procedure, read the missing or corrupted data from the appropriate input element 102, or, second, the output element 106 may read redundancy information from the appropriate store and forward element to reconstruct the missing content. The method applied depends on whether the output is real-time or time-shifted with respect to its input and which method can meet the output timing requirements.

Some embodiments may use content segments small enough such that reconstruction from parity can meet real-time output requirements thereby eliminating the need for retransmission. The use of the RAID-3 (or equivalent) algorithm would have a similar effect. Other embodiments may use large content segments such that retransmission yields lower delay in the reconstruction process. The preferred embodiment is expected to shift over time depending on changes in underlying technology (processors, disks, busses, networks, etc.).

Other embodiments may not integrate storage and forwarding in the manner described above, but use distinct (but interconnected) storage and forwarding (or switching) elements to create a system 100 that behaves in a similar or compatible manner.

Figure 17:
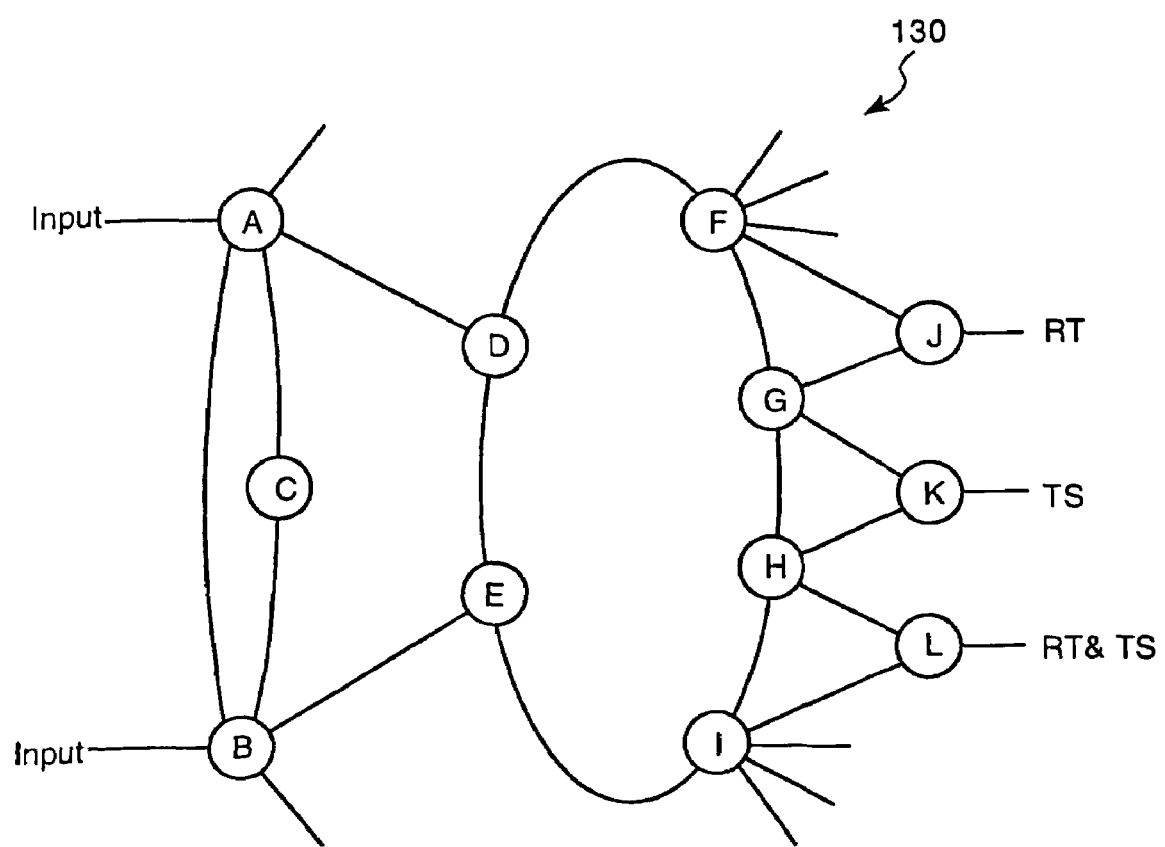
FIG. 17 is a graph diagram of a content propagation and cut-through routing system utilized in the content/service handling and delivery system of FIG. 2.

Referring to FIG. 17, an exemplary content propagation and cut-through routing network 130 is shown. The content propagation and cut-through routing network 130 applies the propagation methods defined in "CONTENT PROPAGATION IN INTERACTIVE TELEVISION" (patent application Ser. No. 09/547,474), incorporated by reference herein, to a network of content storage and cut-through forwarding systems 100 described above. In this context, the term "network" is interpreted broadly as defined in graph theory. Systems (labeled A-L) in the network are interconnected by one or more communications mechanisms and any size, type, or combination of content storage and cut-through forwarding systems may be used. For example, appropriately configured terminal systems would qualify as such and be used to cache content. The preferred embodiment is an efficient, fault tolerant, and load balanced network wherein real-time content need only pass through a network (or subset of a network) once as it is propagated to storages and delivered for presentation and use. The content manager described above controls the various systems in the network system to implement defined propagation and routing procedures thereby controlling how and where content is stored and forwarded through the network as a whole.

Any of a variety of routing algorithms may be used to setup the systems (paths) used for forwarding content through the network. The type of routing algorithm used will depend on the size, type of network, and the underlying communications mechanisms used. In some embodiments, edge routing as opposed to hop-by-hop routing may be used whereby edge systems compute and recomputed optimal routes based on content availability and loading information collected from (or broadcast by) systems in the network. This approach enhances fault tolerance and load balancing: if internal systems fail or overload, those systems are removed from edge route computations and those computations are distributed across edge systems; if edge systems fail, the route signaling load on the system is likewise reduced.

One aspect stores real-time content on systems in the network 130 as it is delivered to terminal systems. The stored content is delivered on-demand (e.g., time-shifted) to other terminal systems.

Another aspect delivers content to terminal systems from systems to which they are only indirectly connected. The content is routed to terminal systems through one or more systems and optionally cached by those systems.

Another aspect delivers content that is an aggregate of real-time and/or previously stored content. For example, video ads may be spliced into real-time or stored video routed through a network or stored banner ads may be transmitted along with web page content routed through a network.

Another aspect provides for delivery for content segmented (fragmented) across systems in the network. For example, a system in the network may begin to cache content it is forwarding in response to the user pausing the presentation. If the presentation is resumed, content is delivered from the cache. If the presentation is reversed (rewound), content missing from the cache is routed through and possibly added to the cache. Other caching strategies may be employed, such as caching some amount of the most recently used content (e.g., the last 10 minutes) or pre-fetching (e.g., faster than real-time) content to be delivered later.

FIG. 17 illustrates content propagation and cut-through routing as a network 130 of content storage and cut-through forwarding systems labeled A through L. In this illustration, all systems in the network are at least doubly connected to provide for failure recovery and load balancing. FIG. 16 and the following examples are intended to illustrate the various concepts and embodiments of content propagation and cut-through routing. In real deployments a variety of topologies, differing from the one shown here, would likely be used.

The network 130 could represent systems deployed across organizational, geographic, or topological boundaries. For example, A, B, and C may be located at content originator facilities (e.g., television or web site production facilities); E and D may be located at regional or municipal facilities; F, G, H, and I may be located at local or neighborhood facilities; and J, K, and L could be suitably configured terminal devices (set top boxes, personal video recorders) located at user (or subscriber) locations.

FIG. 17 shows three of the different ways that content can be delivered by the system 130. Real-time content is delivered by J. Time-shifted content is delivered by K. And a combination of time-shifted and real-time content is delivered by L. A variety of delivery paths could be used and the delivery path could change dynamically to load balance the system or to recover from failures.

D and E could be large content repositories (one primary, one backup) through which all content in the network is delivered and stored.

Real-time content to J may cut-through though systems B, E, D, and F and be stored on D in the process. The content might also be stored on F if the content is given sufficient weight (e.g., a high expectation of subsequent demand). The content may also be background propagated to E as a backup for D.

Time-shifted viewing of the same content on K would cut-through G. Again the content may be stored on G.

Real-time content is routed though L (a appropriately configured set top box or personal video recorder, for example) and content previously stored on L (or other network system) could replace, overlay, or otherwise mix with the real-time content. Thus the system is used to insert advertising specific to the user or users receiving content from L.

A number of embodiments of the invention have been described. Nevertheless, it will be understood that various modifications may be made without departing from the spirit and scope of the invention. For example, each of the various components described above are managed as a whole and will continue to be managed as they become increasingly integrated over time. Accordingly, other embodiments are within the scope of the following claims.

What is claimed is:

1. A method for placement of advertising content for presentation to one or more viewers, comprising at a server the steps of:
   maintaining an inventory of advertising opportunities to present advertising during delivery of programming content or services to one or more viewers, each advertising opportunity being associated with viewer and presentation attributes that comprise demographic information associated with the one or more viewers and information associated with a manner in which advertising is presented during the opportunity;
   receiving advertising content from a plurality of advertising content providers;
   further receiving a plurality of software programs from the plurality of advertising content providers, each software program corresponding to specific advertising content from a corresponding advertising content provider;
   executing each of the plurality of software programs to discover and match the viewer and presentation attributes associated with each of the advertising opportunities against a desired set of viewer and presentation attributes for a desired advertising opportunity in which to present the specific advertising content and to generate a set of corresponding matching result values, each of the matching result values being indicative of the extent to which the desired set of viewer and presentation attributes associated with the specific advertising content matches the viewer and presentation attributes of a corresponding advertising opportunity;
   binding each of the advertising opportunities to a selected one of the advertising content having an optimal matching result value corresponding to the advertising opportunity; and
   composing the selected one of the advertising content bound to each of the advertising opportunities with the programming content or services.

2. The method of claim 1 further comprising delivering the selected advertising content with the programming content or services to the one or more viewers.

3. The method of claim 1 further comprising importing the advertising content from the plurality of advertising content providers.

4. The method of claim 1 further comprising receiving each of the plurality of software programs conveyed in-band with the specific advertising content.

5. The method of claim 1 further comprising importing the desired set of viewer and presentation attributes for the desired advertising opportunity in which to present the specific advertising content as input to the corresponding software program.

6. The method of claim 1 further comprising importing ancillary data associated with the programming content or services.

7. The method of claim 6 wherein the ancillary data includes available advertising times associated with the programming content or services.

8. The method of claim 6 further comprising importing said ancillary data conveyed in-band with the associated programming content or services.

9. The method of claim 6 further comprising importing said ancillary data conveyed out-of-band with the associated programming content or services.

10. The method of claim 1 wherein the advertising content being associated with attributes corresponding to one or more of advertiser agreements, advertising placements schedules, and useful lifetimes.

11. The method of claim 1 further comprising maintaining an inventory of dynamically appearing advertising opportunities to present advertising.

12. The method of claim 11 wherein the programming content or service comprises programming content or services stored or delayed to enable time-shifted viewing of the programming content or services.

13. The method of claim 11 further comprising binding each of the dynamically appearing advertising opportunities to the selected advertising content before the dynamically appearing advertising opportunity is consumed.

14. The method of claim 11 further comprising binding each of the dynamically appearing advertising opportunities to the selected advertising content just in time before the dynamically appearing advertising opportunity is consumed.

15. The method of claim 1 wherein composing the selected advertising content with the programming content or services further comprises replacing advertisements in the programming content or services with the selected advertising content.

16. The method of claim 1 further comprising mediating handling of the programming content or services from numerous originators.

17. The method of claim 1 comprising mediating handling of the advertising content from the plurality of advertising content providers.

18. The method of claim 11 wherein the inventory of dynamically appearing opportunities to present advertising is associated with time-shifted viewing of the programming content or services.

19. A method for placement of advertising content for presentation to one or more viewers comprising at a server the steps of:
   maintaining an inventory of advertising opportunities to present advertising during delivery of programming content or services to one or more viewers, each advertising opportunity being associated with viewer and presentation attributes that comprise demographic information associated with the one or more viewers and information associated with a manner in which advertising is presented during the opportunity;
   receiving advertising content from a plurality of advertising content providers;
   further receiving a plurality of software programs from the plurality of advertising content providers, each software program corresponding to specific advertising content from a corresponding advertising content provider;
   executing each of the plurality of software programs to discover and match the viewer and presentation attributes associated with each of the advertising opportunities against a desired set of viewer and presentation attributes for a desired advertising opportunity in which to present the specific advertising content and to generate a set of corresponding matching result values, each of the matching result values being indicative of the extent to which the desired set of view and presentation attributes associated with the specific advertising content matches the viewer and presentation attributes of a corresponding advertising opportunity; for each opportunity to present advertising in the inventory, binding a selected one of the binding each of the advertising opportunities to a selected one of the advertising content having an optimal matching result value corresponding to the advertising opportunity.

20. A server system for placement of advertising content for presentation to one or more viewers comprising:

a data store maintaining an inventory of advertising opportunities to present advertising during delivery of programming content or services to one or more viewers, each advertising opportunity being associated with viewer and presentation attributes that comprise demographic information associated with the one or more viewers and information associated with a manner in which advertising is presented during the opportunity;

the data store receiving advertising content from a plurality of advertising content provider;

the data store further receiving a plurality of software programs from the plurality of advertising content providers, each software program corresponding to specific advertising content from a corresponding advertising content provider;

a service executing each of the plurality of software programs to discover and match the viewer and presentation attributes associated with each of the advertising opportunities against a desired set of viewer and presentation attributes for a desired advertising opportunity in which to present the specific advertising content and to generate a set of corresponding matching result values, each of the matching result values being indicative of the extent to which the desired set of view and presentation attributes associated with the specific advertising content matches the viewer and presentation attributes of a corresponding advertising opportunity; and the service binding each of the advertising opportunities to a selected one of the advertising content having an optimal matching result value corresponding to the advertising opportunity.

21. A server system for placement of advertising content for presentation to one or more viewers, comprising:

means for maintaining an inventory of advertising opportunities to present advertising during delivery of programming content or services to one or more viewers, each advertising opportunity being associated with viewer and presentation attributes that comprise demographic information associated with the one or more viewers and information associated with a manner in which advertising is presented during the opportunity;

means for receiving advertising content from a plurality of advertising content providers;

means for further receiving a plurality of software programs from the plurality of advertising content providers, each software program corresponding to specific advertising content from a corresponding advertising content provider;

means for executing each of the plurality of software programs to discover and match the viewer and presentation attributes associated with each of the advertising opportunities against a desired set of viewer and presentation attributes for a desired advertising opportunity in which to present the specific advertising content and to generate a set of corresponding matching result values, each of the matching result values being indicative of the extent to which the desired set of view and presentation attributes associated with the specific advertising content matches the viewer and presentation attributes of a corresponding advertising opportunity;

means for binding each of the advertising opportunities to a selected one of the advertising content having an optimal matching result value corresponding to the advertising opportunity.

* * * * *

UNITED STATES PATENT AND TRADEMARK OFFICE
CERTIFICATE OF CORRECTION

PATENT NO. : 7,451,467 B2  Page 1 of 1
APPLICATION NO. : 10/455916
DATED : November 11, 2008
INVENTOR(S) : David Carver et al.

It is certified that error appears in the above-identified patent and that said Letters Patent is hereby corrected as shown below:

In claim 19, Column 20, Line 42, replace "viewers" with "viewers,"

In claim 19, Column 21, Lines 2, 3 and 4, omit the words "for each opportunity to present advertising in the inventory, binding a selected one of the"

In claim 20, Column 21, Line 21, replace "provider" with "providers"

Signed and Sealed this

Tenth Day of February, 2009

JOHN DOLL
*Acting Director of the United States Patent and Trademark Office*